July 17, 1951        J. JUERGENS        2,561,122
LIVESTOCK PROD
Filed Oct. 29, 1948
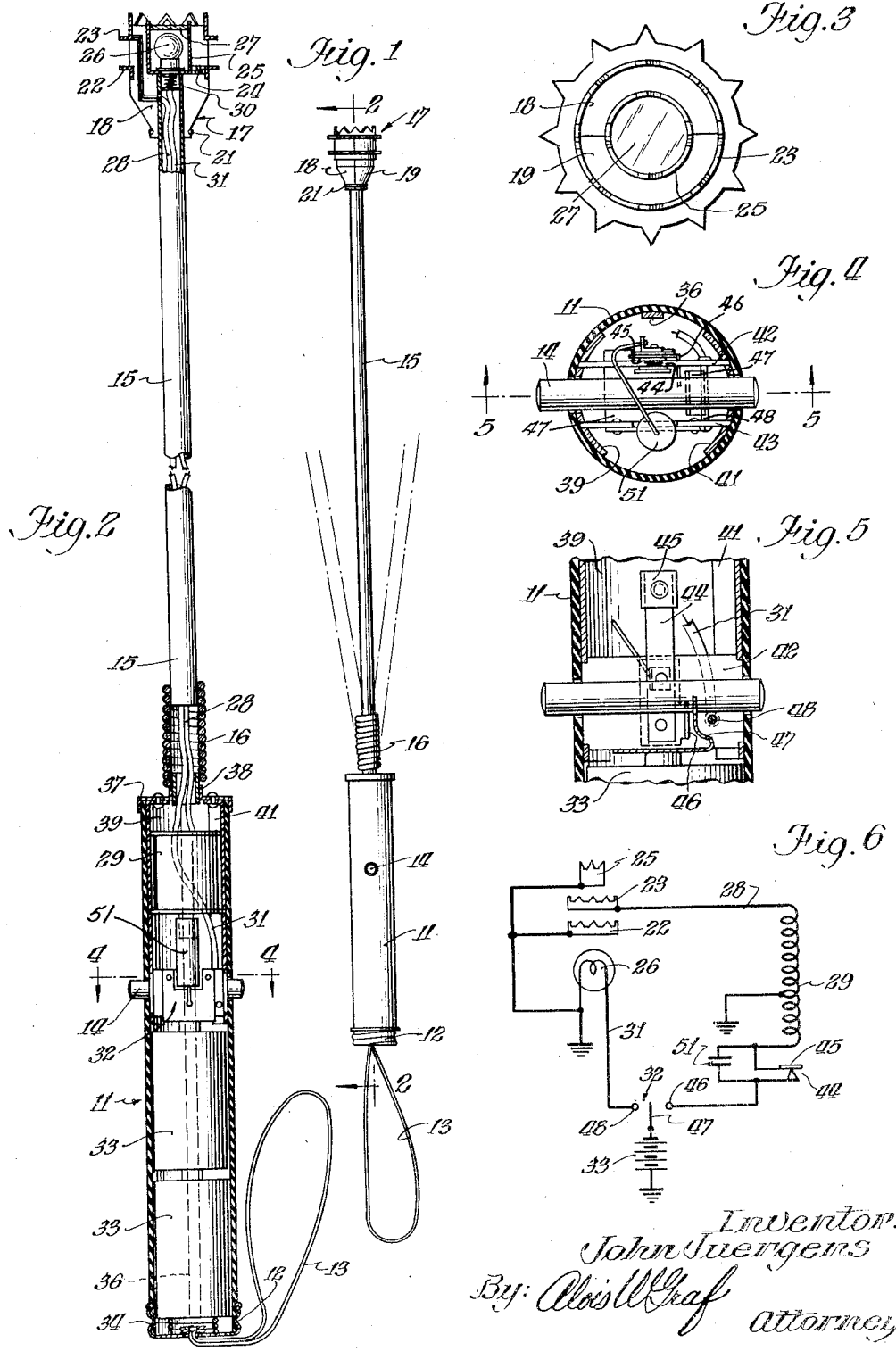
Inventor:
John Juergens
By: Alois U Graf
Attorney Patented July 17, 1951

2,561,122

UNITED STATES PATENT OFFICE 2,561,122

LIVESTOCK PROD

John Juergens, McHenry, Ill., assignor to Leterstone Sales Co., a corporation of Illinois Application October 29, 1948, Serial No. 57,273

3 Claims. (Cl. 231—2)

The present invention relates to a prod for livestock and more particularly to an improved prod of the type which applies a high potential electric shock to the livestock.

Heretofore it has been proposed to provide a prod for livestock and in particular, cattle, which would urge on the livestock by the application of a high potential electric shock whenever the usual physical prodding fails to provide satisfactory results. Heretofore, however, such attempts in providing a prod of this type have been productive of a relatively heavy device which was burdensome to carry and difficult to manipulate.

In accordance with the present invention it is proposed to provide an improved prod for livestock which is simple and economical to manufacture.

It is an object of the present invention to provide an improved prod for livestock which is light in weight and yet sufficiently strong to withstand impact and shock when the prod is used to apply physical force to an animal.

Another object of the present invention is to provide an improved electric prod for shocking livestock.

Another object of the present invention is to provide a combination electric prod and flashlight.

Still another object of the present invention is to provide in an improved prod a simple electric switch for controlling the operation of the prod.

Other and further objects of the present invention subsequently will become apparent by reference to the following description taken in conjunction with the accompanying drawings wherein:

Fig. 1 is a plan view of a prod for livestock constructed in accordance with the present invention;

Fig. 2 is a view partially in cross-section as seen in the direction of the arrows along the line 2—2 of Fig. 1;

Fig. 3 is an end view of the head of the prod;

Fig. 4 is a cross-sectional view as seen in the direction of the arrows along the line 4—4 of Fig. 2;

Fig. 5 is a cross-sectional view as seen in the direction of the arrows along the line 5—5 of Fig. 4; and Fig. 6 is a diagram of the electric circuit of the prod.

Referring to the drawings it will be noted that the prod constructed in accordance with the present invention comprises a handle portion 11 having an end cap 12 which supports a carrying loop 13. The handle portion 11 also has a push button 14 which extends outwardly to both the sides of the handle 11 for selective operation in either direction to control the application of power for shocking purposes or to energize an electric bulb.

The handle portion 11 is connected to a tubular extension 15 by a resilient portion 16 which may be in the form of a closely coiled spring connector. At the outer extremity of the tubular extension 15 there is located a prod head 17 which is used to apply high potential current to an animal where the animal requires more persuasion than can be applied by a physical thrust of the prod. As may be seen from the dotted line representations in Fig. 1 the resilient spring connector 16 permits the prod to be used in a physical manner including an action similar to the use of a whip or stick. Due to the fact that the entire device is constructed so as to minimize weight as much as possible the resilient connection 16 prevents the application of any force sufficient to damage the prod.

It will be noted from Figs. 1, 2 and 3 that the prod head 17 is constructed of an insulating material of two similar portions 18 and 19 retained in position on the extremity of the tubular extension 15 by a clip ring 21.

In addition to the ring 21 the head portions 18 and 19 are held together by metal rings 22 and 23. The metal ring 22 has a periphery provided with sharp points, and the ring is connected by means of a spring 24 to an inner metal cup 25 which is in electrical conductivity with the tubular extension 15. The outer edge of the cup 25 is also provided with a number of points as is apparent from Fig. 3. The cup 25 together with the extremity of the tubular member 15 serve as a socket for an electric bulb 26 which may be protected by a lens 27 carried by the cup 25. The ring 23 which is provided with points extending laterally and vertically in Fig. 2 is connected by an electrical conductor 28 to an induction coil 29.

The electric bulb 26 which is of the single contact variety is connected through a spring and electric conductor 31 which is connected to a contact of the switch 32 which is actuated by the push button 14. The switch 32 is engaged by the positive terminal of a plurality of dry cells 33 having their negative terminal engaged by a spring 34 which is in contact with the screw cap 12. The screw cap 12 is connected by an electrically conductive strip 36 to the upper cap 37 of the handle member 11 which carries a tubular portion 38 supporting the lower extremity of the spring member 16.

Preferably, the handle member 11 is in the form of an insulated tubular member which carries within its interior a support frame 39 and 41 which supports the switch structure 32 and also the induction coil 29.

The manner in which the switch structure 32 is supported will become apparent from a description of the details of the switch as illustrated more particularly in Figs. 4 and 5. The support members 39 and 41 are provided with suitable slots for receiving the extremities of two transversely arranged strips of insulating material 42 and 43 forming a portion of the switch 32. The insulating strip 42 carries a pair of switch contacts 44 one of which is provided with a magnetic armature 45 adapted to be vibrated by the core of the induction coil 29. One of the switch contacts of the pair of contacts 44 is electrically connected to a contact 46 which projects at right angles through the insulating member 42 for cooperation with a movable switch blade 47, normally biased to open circuit position, which is actuated by the push button 14. The movable switch blade 47 formed of resilient metal has a vertically extending portion which is engaged by a slot cut into the rod. The movable blade 47 is a portion of a conductive strip mechanically carried by the insulating member 43. In Figure 4 it will be seen that this strip 47 extends underneath the insulating member 43 and an upturned portion is held on the member 43 by a plurality of rivets. A portion of the movable contact 47 is engaged by the positive terminal of the battery 33 as is apparent from Fig. 5. The insulating strips 42 and 43 are connected together by a pin 48 which also serves as an electrical contact connected to the conductor 31. The pin 48 is arranged to be contacted by the switch blade 47 when the push button 14 is pulled toward the right as viewed in Figs. 4 and 5. When the push button 14 is pulled toward the left as seen in Figs. 4 and 5 contact is made with the contact 46 thereby to energize the induction coil 29. A suitable condenser 51 is effectively connected across the make and break contact 44.

From the circuit diagram in Fig. 6 it will be seen that when the switch blade 47 is moved toward the right the high potential coil 29 is energized by completing an electric circuit through the contact 44 and the primary portion of the induction coil 29. Energy flowing through the primary winding of the induction coil 29 causes flux to be generated in the magnetic core thereby to attract the armature 45 and serves to interrupt the circuit of the contact 44. This interruption of the circuit produces pulses of electrical energy which produce in the high potential portion of the coil 29 a high potential between ground and the pointed ring 23. Thus high potential exists between the ring 23 and each of the rings 22 and 25. Since the tubular extension 15 is at ground potential the operator of the prod will feel no electric shock since the only high potential present is at the head of the prod. When the switch 47 which is actuated by the push button 14 is moved in the opposite direction the bulb 26 may be energized thereby to provide the convenience of a guide or flashlight.

From the constructions illustrated in Figs. 4 and 5 it will become apparent that it is relatively simple to assemble the high potential mechanism of the electric switch since opposite ends of the induction coil 29 are provided with fiber spool ends which are frictionally engaged by the frame members 39 and 41. The switch 32 is readily inserted into position by causing the fiber strips 42 and 43 to engage suitable slots in support or frame members 39 and 41. After these parts have been placed into position the frame members 39 and 41 are inserted into the handle portion 11. The switch rod 14 is inserted into the opening and moved into position until the slot in the rod is engaged by the movable switch blade 47. In order to remove the assembly for repair it is only necessary to rotate the switch rod 14 one half turn and withdraw it. Thereupon the rest of the mechanism may be withdrawn from the handle casing 11.

From Figure 6 it will be noted that a single electromagnetic winding 29 is provided for the autotransformer inverter. The winding 29 is provided with a magnetic core to form a solenoid structure which actuates an armature 45 to move one of the contacts cooperating with the contacts 44. This arrangement, therefore, is economical of space and materials.

While for the purpose of illustrating and describing the present invention a preferred embodiment has been illustrated in the drawings, it is to be understood that the invention is not to be limited thereby since such variations in the components employed and in their arrangement is contemplated as may be commensurate with the spirit and scope of the invention set forth in the accompanying claims.

What I desire to protect by United States Letters Patent is claimed as follows:

1. A prod for animals comprising an insulated casing serving as a handle and having therein a receptacle for a battery, electrical conductor means within said receptacle for contacting a battery, a vibratory inverter of the autotransformer type mounted within said casing for changing direct current from a battery into high potential current, said inverter having a single winding and an armature actuated thereby, a push button switch biased to open circuit position interposed between said battery receptacle and said inverter, a helical spring, a tubular metal rod conected to said casing by said helical spring, an insulator mounted on the outer extremity of said rod, a plurality of ring electrodes mounted on said insulator and extending exteriorly thereof, and circuit connections between said inverter and said electrodes.

2. A prod for animals comprising an insulating casing serving as a handle and having therein a battery receptacle, a switch and a vibratory inverter, electrical conductor means for interconnecting said switch and said inverter with a battery in said receptacle, a tubular rod, a helical spring interconnecting said rod and said casing and being electrically connected to said inverter, an insulator mounted on the free end of said rod, a plurality of ring electrodes mounted on said insulator, one of said electrodes being connected by an insulated conductor to said inverter, said switch being biased to open circuit position and connected in circuit between said inverter and said battery compartment, said inverter comprising a solenoid having an autotransformer winding which is connected in circuit with said switch and in circuit with said electrodes.

3. A prod for animals comprising an insulated tubular casing serving as a handle and having therein a battery receptacle, electrical conductor means for interconnecting a battery in said receptacle with said switch and said inverter, a switch and a vibratory inverter, a tubular metal rod, a helical spring interconnecting said rod and said casing and being electrically connected to said inverter, a split annular insulator mounted on the free end of said rod, a plurality of ring electrodes mounted on said insulator and extending exteriorly thereof, one of said electrodes serving to hold together said insulator on said rod, one of said electrodes being connected by an insulated conductor to said inverter, said switch being located between said compartment and said inverter and comprising a push button switch biased to open circuit position and connected in electrical circuit between said inverter and said battery compartment, said inverter comprising a solenoid having an autotransformer winding, one part of said winding being connected in circuit with said switch and the remainder of said winding being connected in circuit with said electrodes.

JOHN JUERGENS.

REFERENCES CITED

The following references are of record in the file of this patent:

UNITED STATES PATENTS

| Number | Name | Date |
|---|---|---|
| Re. 20,298 | Roviosky | Mar. 16, 1937 |
| 362,469 | Swan | May 3, 1887 |
| 1,140,365 | Dixon | May 25, 1915 |
| 1,158,473 | Floyd | Nov. 2, 1915 |
| 1,189,532 | Bishop | July 4, 1916 |
| 2,086,323 | Garstang | July 6, 1937 |
| 2,289,475 | Anders | July 14, 1942 |
| 2,302,787 | Meehan | Nov. 24, 1942 |
| 2,306,638 | Meisler | Dec. 29, 1942 |
| 2,388,625 | Wagenknecht | Nov. 6, 1945 |
| 2,421,865 | Beeman | June 10, 1947 |